(12) United States Patent
Takai et al.

(10) Patent No.: US 7,604,880 B2
(45) Date of Patent: *Oct. 20, 2009

(54) INFORMATION RECORDING MEDIUM (75) Inventors: Mitsuru Takai, Tokyo (JP); Yoshikazu Soeno, Tokyo (JP); Katsumichi Tagami, Tokyo (JP); Kazuya Shimakawa, Tokyo (JP); Takahiro Suwa, Tokyo (JP)

(73) Assignee: TDK Corporation, Tokyo (JP)

( * ) Notice: Subject to any disclaimer, the term of this patent is extended or adjusted under 35 U.S.C. 154(b) by 363 days.

This patent is subject to a terminal disclaimer.

(21) Appl. No.: 11/085,522

(22) Filed: Mar. 22, 2005

(65) Prior Publication Data
US 2005/0233176 A1   Oct. 20, 2005

(30) Foreign Application Priority Data
Mar. 25, 2004   (JP)   ............... 2004-088433

(51) Int. Cl.
G11B 5/64   (2006.01)
G11B 5/72   (2006.01)

(52) U.S. Cl. ............... 428/833.3; 428/835.5
(58) Field of Classification Search .......... 428/826
See application file for complete search history.

(56) References Cited

U.S. PATENT DOCUMENTS

| | | | |
|---|---|---|---|
| 6,014,296 A * | 1/2000 | Ichihara et al. ............ 360/135 |
| 6,583,957 B1 | 6/2003 | Takeshita et al. | |
| 6,852,010 B2 * | 2/2005 | Takahashi et al. ............ 451/36 |
| 7,230,795 B2 * | 6/2007 | Fujita et al. ............ 360/135 |
| 2004/0259039 A1 | 12/2004 | Oyake et al. | |
| 2005/0045583 A1 | 3/2005 | Fujita et al. | |
| 2005/0185561 A1 * | 8/2005 | Hattori et al. ............ 369/94 |
| 2006/0063042 A1 * | 3/2006 | Takai et al. ............ 428/848.2 |
| 2006/0132970 A1 * | 6/2006 | Takai et al. ............ 360/125 |
| 2006/0172154 A1 * | 8/2006 | Suwa et al. ............ 428/836 |

FOREIGN PATENT DOCUMENTS

| JP | 2-023512 | 1/1990 |
|---|---|---|
| JP | 4-014610 | 1/1992 |
| JP | 5-028469 | 2/1993 |
| JP | 5-073879 | 3/1993 |
| JP | 7-006359 | 1/1995 |

(Continued)

OTHER PUBLICATIONS

U.S. Appl. No. 10/829,266 to Koyama et al., filed Apr. 22, 2004.

(Continued)

*Primary Examiner*—Kevin M. Bernatz
*Assistant Examiner*—Gary D. Harris
(74) *Attorney, Agent, or Firm*—Greenblum & Bernstein, P.L.C.

(57) ABSTRACT

In an information recording medium where respective concave parts of a magnetic layer, which is formed on at least one side e of a substrate and in which a predetermined convex/concave pattern has been formed, are filled with non-magnetic material and non-magnetic layers are formed by the non-magnetic material in at least partial regions of respective upper surfaces of respective convex parts of the magnetic layer, the non-magnetic layers are formed so that parts thereof protrude further in a direction in which the convex parts protrude than other parts of the non-magnetic layers.

5 Claims, 5 Drawing Sheets

FOREIGN PATENT DOCUMENTS

| JP | 9-097417 | 4/1997 |
|---|---|---|
| JP | 9-097419 | 4/1997 |
| JP | 2000-195042 | 7/2000 |
| JP | 2000-298822 | 10/2000 |
| JP | 2003-109210 | 4/2003 |

OTHER PUBLICATIONS

English Language Abstract of JP 9-097419.
English Language Abstract of JP 2000-195042.
English Language Abstract of JP 2003-109210.
English Language Abstract of JP 5-028469.
English Language Abstract of JP 2-023512.
English Language Abstract of JP 7-006359.
English Language Abstract of JP 298822.
English Language Abstract of JP 5-073879.
English language Abstract of JP 4-014610.

* cited by examiner

INFORMATION RECORDING MEDIUM

BACKGROUND OF THE INVENTION

1. Field of the Invention

The present invention relates to an information recording medium where a magnetic layer is formed on at least one side of a substrate.

2. Description of the Related Art

Increases in areal recording density of a magnetic recording medium (information recording medium) such as a hard disk have conventionally been achieved by increasing both the linear recording density and the track density. To achieve further increases in areal recording density in the future, both linear recording density and track density will have to be raised further. Methods of increasing the linear recording density include improving the recording resolution of a magnetic head and increasing the coercive force and/or reducing the noise for the magnetic recording medium, with the spacing between the magnetic head and the magnetic recording medium also being reduced.

On the other hand, various problems have emerged relating to the raising of track density, such as the occurrence of side fringes and crosstalk due to the head magnetic field spreading and the limit on how small the head can be made, so that with conventional methods, there is a limit on how much track density, and in turn areal recording density, can be increased. For this reason, a discrete track-type magnetic recording medium that has a recording layer formed in a predetermined convex/concave pattern has been proposed as a magnetic recording medium for which the areal recording density can be further increased. For this type of discrete track-type magnetic recording medium, there is a known problem in that the fly characteristics of the magnetic head deteriorate due to the effects of the concave parts in the convex/concave pattern. As a means of solving this problem, a magnetic disk disclosed by Japanese Laid-Open Patent Publication No. H09-97419 is known. This magnetic disk includes a guard band member formed by filling the concave parts (guard band spaces) in the convex/concave pattern with a non-magnetic material. In this case, the surface of the magnetic disk is polished to produce a state where there is no difference in height between the recording magnetic member and the guard band member, that is, a state where the surface of the magnetic disk has been made smooth.

SUMMARY OF THE INVENTION

By investigating the conventional magnetic disk described above, the present inventors discovered the following problems. As stated above, the surface of the conventional magnetic disk is made smooth. On the other hand, in a magnetic recording apparatus including this type of magnetic disk, the magnetic head for recording and reproducing data is caused to fly a predetermined distance above the surface of the magnetic disk to prevent the magnetic head and the magnetic disk from coming into contact with one another. However, in particular, during a seek operation where the magnetic head is moved in the radial direction, there are cases where the surface of the magnetic disk and the magnetic head come into contact due to fluctuations in the air flow between the disk surface and the magnetic head. Here, since the surface of the conventional magnetic disk has been smoothed, in a magnetic recording apparatus equipped with this magnetic disk, the magnetic disk and the magnetic head come into surface contact, resulting in the problem that it is easy for abrasion to occur for the magnetic head and the surface of the magnetic disk. There are further problems in that when the magnetic head is brought close to the surface of a magnetic disk that has been highly smoothed, since the head surface of the magnetic head is also smoothed, there is the risk of both surfaces sticking and the risk of the magnetic head and the surface of the magnetic disk becoming damaged due to such sticking. In this case, in the same way as with a continuous film-type magnetic disk in which a convex/concave pattern is not formed, a method that forms a texture (fine convexes and concaves) in the surface of the magnetic layer by laminating the recording layer (the magnetic layer) and the like after producing a predetermined roughness in the surface of the substrate is conceivable. However, when manufacturing a discrete track-type magnetic disk, since the respective concave parts of the magnetic layer are filled with a non-magnetic material and polished as described above, the texture is also smoothed. Accordingly, the problem described above still occurs even when this method is used.

The present invention was conceived in view of the problems described above, and it is a principal object of the present invention to provide an information recording medium where abrasion of the information recording medium and the magnetic head due to contact between the information recording medium surface and the magnetic head can be reduced, and the occurrence of damage to the information recording medium and the magnetic head due to sticking can also be reduced.

To achieve the stated object, in an information recording medium according to the present invention, respective concave parts of a magnetic layer, which is formed on at least one side of a substrate and in which a predetermined convex/concave pattern has been formed, are filled with non-magnetic material, and non-magnetic layers are formed by the non-magnetic material in at least partial regions of respective upper surfaces of respective convex parts of the magnetic layer, wherein the non-magnetic layers are formed so that parts thereof protrude further in a direction in which the convex parts protrude than other parts of the non-magnetic layers.

According to the information recording medium according to the present invention, by forming the non-magnetic layers so that parts thereof protrude more than other parts, even if the airflow between the surface of the information recording medium and a magnetic head fluctuates during a seek, it is possible to restrict contact between the magnetic head and the surface of the information recording medium to line or point contact. This means that compared to a conventional information recording medium whose surface is smooth, it is possible to sufficiently restrict the contact area of the magnetic head and the surface of the information recording medium during contact and abrasion to the magnetic head and the surface of the information recording medium due to such contact can be sufficiently reduced. Since suitable convexes and concaves are formed by the non-magnetic layers, parts of which protrude, it is possible to sufficiently reduce the occurrence of damage to the magnetic head and the surface of the information recording medium due to the surface of the information recording medium and the magnetic head sticking.

In this case, the non-magnetic layers may be formed in entire regions of the respective upper surfaces of the respective convex parts. By using this construction, direct contact between the magnetic head and the magnetic layer can be avoided, so that not only abrasion to the magnetic head but also abrasion to the magnetic layer can be reliably prevented.

It is also possible to form the non-magnetic layers in regions aside from edge parts of the respective upper surfaces of the respective convex parts. By using this construction, the amount of non-magnetic material present between the magnetic head and the convex parts during the recording and reproduction of data is reduced by an amount corresponding to the lack of non-magnetic material at the edges of the respective upper surfaces, so that it is possible to reduce the spacing loss, resulting in an improvement in the recording and reproduction characteristics.

It is also possible to form the non-magnetic layers so that toward central parts of the convex parts, the non-magnetic layers gradually protrude further in the direction in which the convex parts protrude. By using this construction, it is possible to make the non-magnetic layers smooth without corner parts. Accordingly, damage to the magnetic head and the surface of the information recording medium when the magnetic head contacts the surface of the information recording medium can be sufficiently prevented.

In another information recording medium according to the present invention, respective concave parts of a magnetic layer, which is formed on at least side of a substrate and in which a predetermined convex/concave pattern has been formed, are filled with non-magnetic material, wherein parts of respective upper surfaces of respective convex parts of the magnetic layer are formed so as to protrude further in a direction in which the convex parts protrude than other parts of the upper surfaces.

According to the information recording medium according to the present invention, parts of respective upper surfaces of respective convex parts of the magnetic layer are formed so as to protrude further than other parts of the upper surfaces, so that even if the airflow between the surface of the information recording medium and a magnetic head fluctuates during a seek, it is possible to restrict contact between the magnetic head and the surface of the information recording medium to line or point contact. This means that compared to a conventional information recording medium whose surface is smooth, it is possible to sufficiently restrict the contact area of the magnetic head and the surface of the information recording medium during contact, and abrasion to the magnetic head and the surface of the information recording medium due to such contact can be sufficiently reduced. Since suitable convexes and concaves are formed by the convex parts, parts of which protrude, it is possible to sufficiently reduce the occurrence of damage to the magnetic head and the surface of the information recording medium due to the surface of the information recording medium and the magnetic head sticking.

Here, the respective convex parts may be formed so that the respective upper surfaces thereof protrude beyond surfaces of the non-magnetic material. By using this construction, since there is no non-magnetic material between the respective convex parts of the magnetic layer and the magnetic head during recording and reproduction, the recording and reproduction characteristics can be sufficiently improved.

The respective convex parts may be formed so that toward central parts of the respective upper surfaces, the convex parts gradually protrude further in the direction in which the convex parts protrude. By using this construction, the respective convex parts can be made smooth without forming corner parts. Accordingly, damage to the magnetic head and the surface of the information recording medium when the magnetic head contacts the surface of the information recording medium can be sufficiently prevented.

A protective layer may be formed on a top part on the at least one side of the substrate. By using this construction, it is possible to prevent abrasion to the magnetic layer due to contact with the magnetic head, for example, even more reliably.

It should be noted that the disclosure of the present invention relates to a content of Japanese Patent Application 2004-088433 that was filed on 25 Mar. 2004 and the entire content of which is herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of an information recording medium according to the present invention will now be described with reference to the attached drawings.

Figure 1:
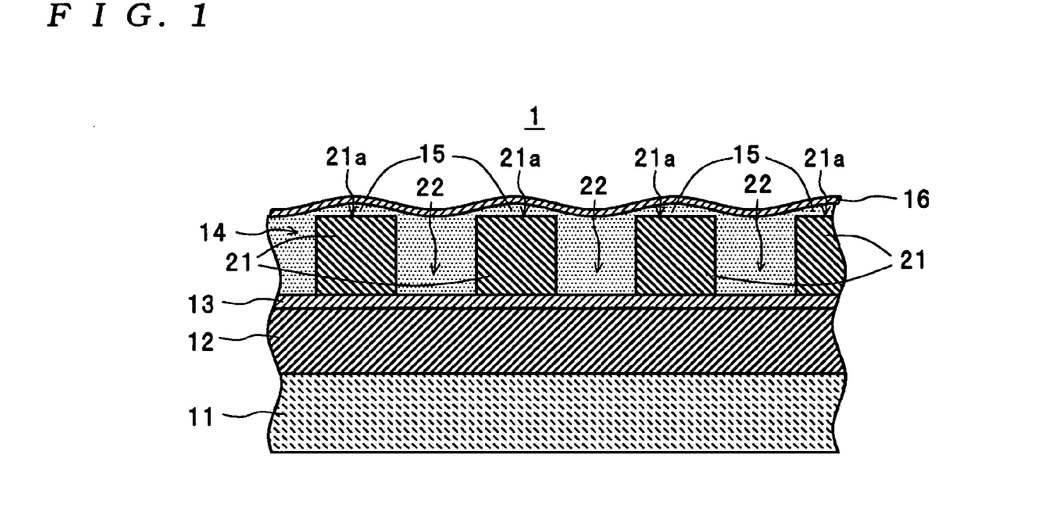
FIG. 1 is a cross-sectional view of a magnetic recording medium.

A magnetic recording medium 1 shown in FIG. 1 is a magnetic disk that is one example of an information recording medium according to the present invention and is disposed inside a housing together with parts such as a spindle motor and a head slider (magnetic head) that are not shown to construct a magnetic recording apparatus. The magnetic recording medium 1 is a discrete track-type magnetic recording medium (patterned medium) on which data can be recorded by perpendicular recording, and as one example, a soft magnetic layer 12 and an intermediate layer 13 as an underlayer are laminated in that order on one side of a glass substrate 11. A magnetic layer 14 of a magnetic material in which a predetermined convex/concave pattern is formed is laminated on the intermediate layer 13. Respective concave parts 22, 22, . . . in the magnetic layer 14 are filled with a non-magnetic material, and non-magnetic layers 15, 15, . . . are formed by the non-magnetic material on respective upper surfaces 21a, 21a, . . . of convex parts 21, 21, . . . in the magnetic layer 14. In this case, as shown in FIG. 1, the non-magnetic layers 15 are formed so that central parts thereof (that correspond to "parts thereof" for the present invention) gradually protrude upward (this corresponds to the "direction in which the convex parts protrude" for the present invention) compared to other parts. A protective layer 16 is also formed on the non-magnetic material that fills the concave parts 22 and on the non-magnetic layers 15 so as to cover these parts. In addition, a lubricant (as one example, a Fomblin lubricant), not shown, is applied onto the protective layer 16.

Figure 2:
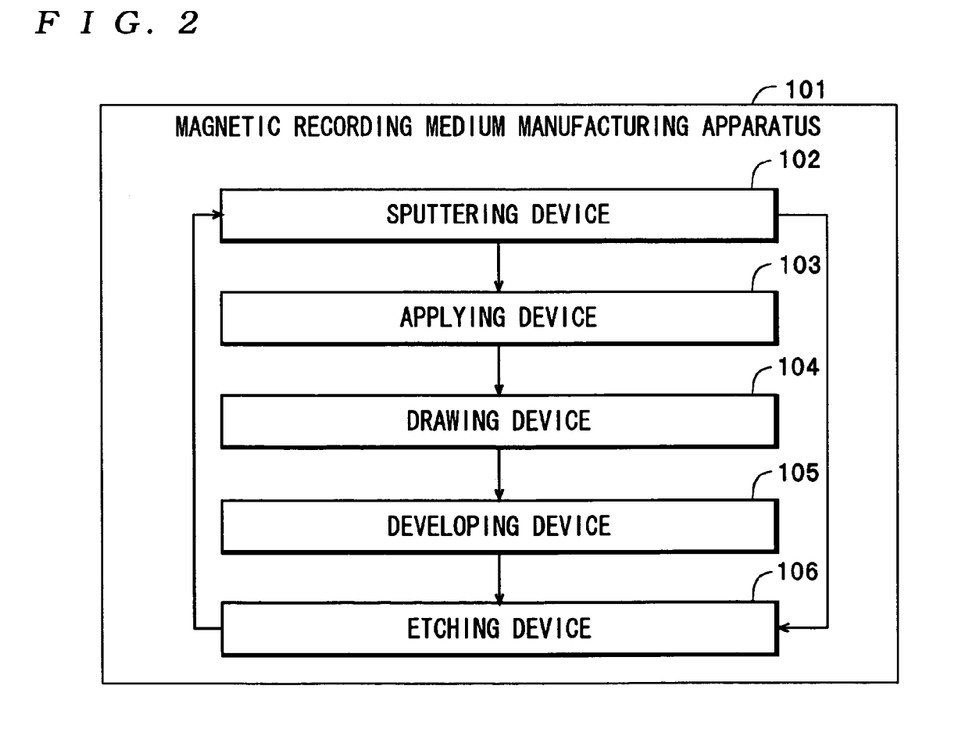
FIG. 2 is a block diagram showing the construction of a magnetic recording medium manufacturing apparatus.
Figure 6:
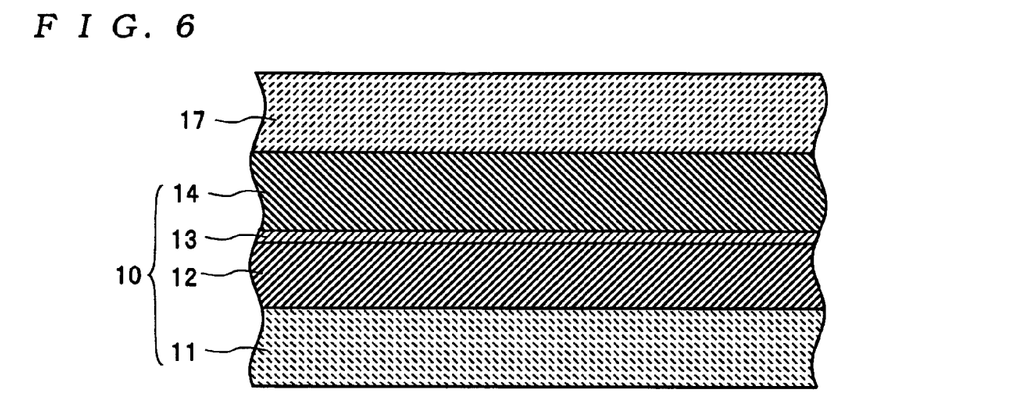
FIG. 6 is a cross-sectional view of a state where a mask forming functional layer has been formed on the magnetic layer.
Figure 9:
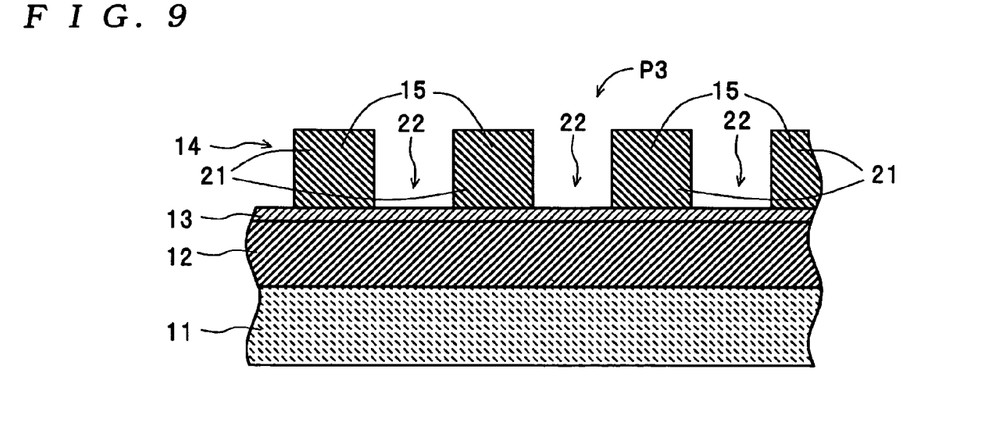
FIG. 9 is a cross-sectional view of a state where a convex/concave pattern has been formed in a magnetic layer.
Figure 10:
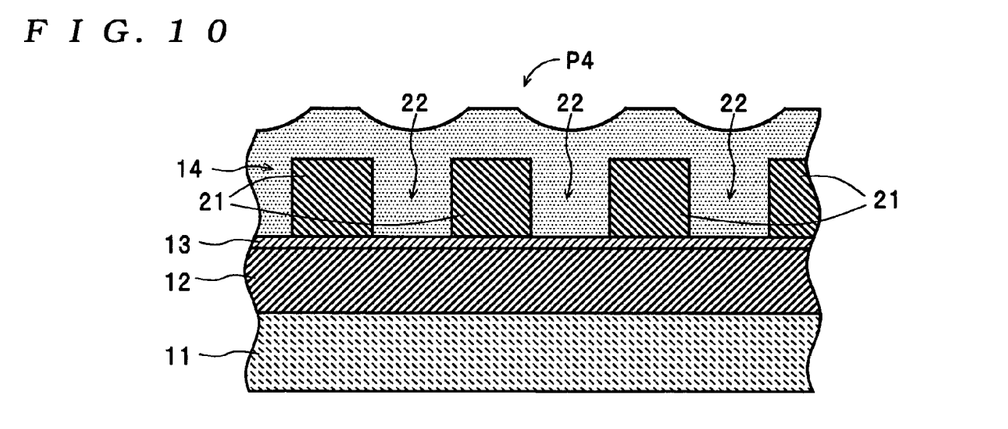
FIG. 10 is a cross-sectional view of a state where the magnetic layer has been covered with a non-magnetic material.

On the other hand, the magnetic recording medium manufacturing apparatus (hereinafter, simply "manufacturing apparatus") 101 shown in FIG. 2 includes a sputtering device 102, an applying device 103, a drawing device 104, a developing device 105, and an etching device 106, and is constructed so as to be capable of manufacturing the magnetic recording medium 1. When manufacturing the magnetic recording medium 1, the sputtering device 102 forms the soft magnetic layer 12, the intermediate layer 13, and the magnetic layer 14 in that order by sputtering on the glass substrate 11 to manufacture a magnetic recording medium manufacturing preform (hereinafter simply "preform") 10 shown in FIG. 3. As shown in FIG. 10, the sputtering device 102 covers the magnetic layer 14 (see FIG. 9) formed in a convex/concave pattern P3 described later with a non-magnetic material by sputtering. As shown in FIG. 6, the applying device 103 applies an electron beam resist (EB resist) by spin coating on the magnetic layer 14 of the preform 10 fabricated by the sputtering device 102 to form a mask forming functional layer 17.

Figure 7:
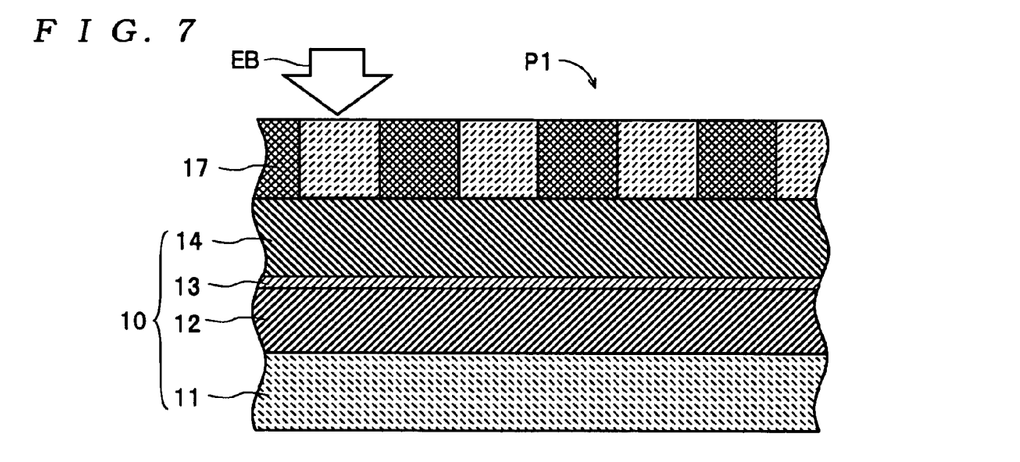
FIG. 7 is a cross-sectional view of a state where an exposure pattern has been drawn by emitting an electron beam onto the mask forming functional layer.
Figure 8:
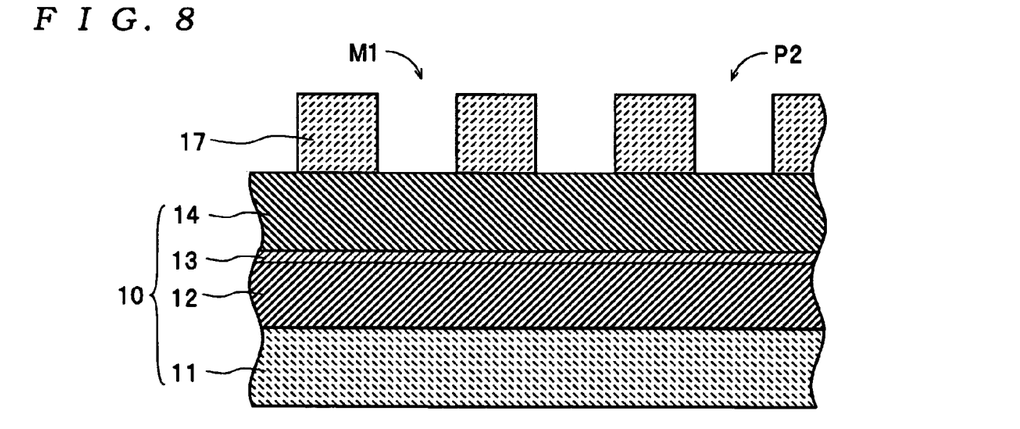
FIG. 8 is a cross-sectional view of a state where a convex/concave pattern (mask) has been formed.
Figure 11:
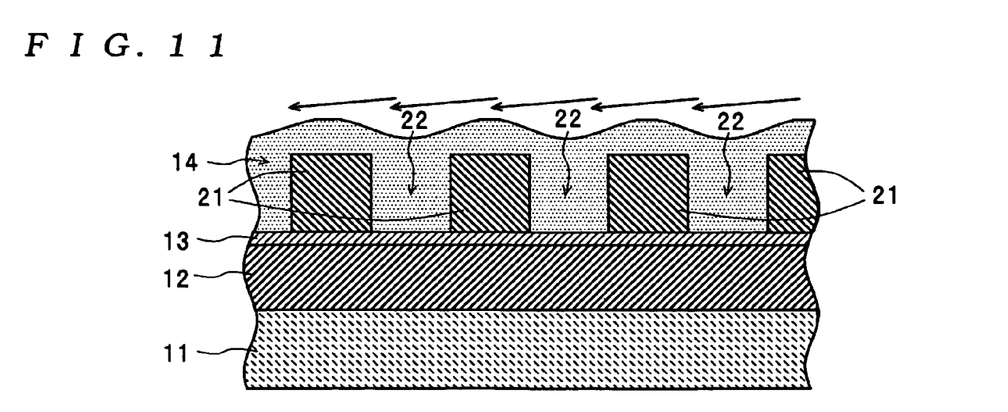
FIG. 11 is a cross-sectional view of a state where ion beam etching is being carried out on the non-magnetic material.
Figure 12:
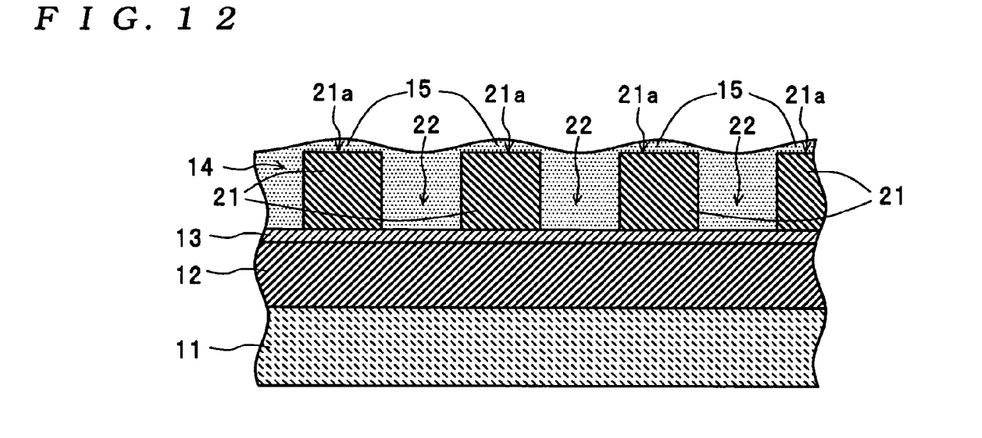
FIG. 12 is a cross-sectional view of a state where non-magnetic layers have been formed on upper surfaces of the convex parts of the magnetic layer.

As shown in FIG. 7, the drawing device 104 irradiates the mask forming functional layer 17 formed by the applying device 103 with an electron beam EB to draw an exposure pattern P1 in the mask forming functional layer 17. The developing device 105 carries out a developing process on the mask forming functional layer 17 for which the drawing of the exposure pattern P1 has been completed by the drawing device 104, and as shown in FIG. 8, the parts of the mask forming functional layer 17 exposed to the electron beam EB are removed to form the convex/concave pattern P2 (a mask M1). The etching device 106 carries out ion beam etching on the magnetic layer 14 using the mask M1 formed by the developing device 105 to form the magnetic layer 14 in the convex/concave pattern P3, as shown in FIG. 9. Also, as shown in FIGS. 11 and 12, the etching device 106 removes part of the non-magnetic material with which the sputtering device 102 covered the magnetic layer 14.

Next, a method of manufacturing that manufactures the magnetic recording medium 1 using the manufacturing apparatus 101 will be described with reference to the drawings.

Figure 3:
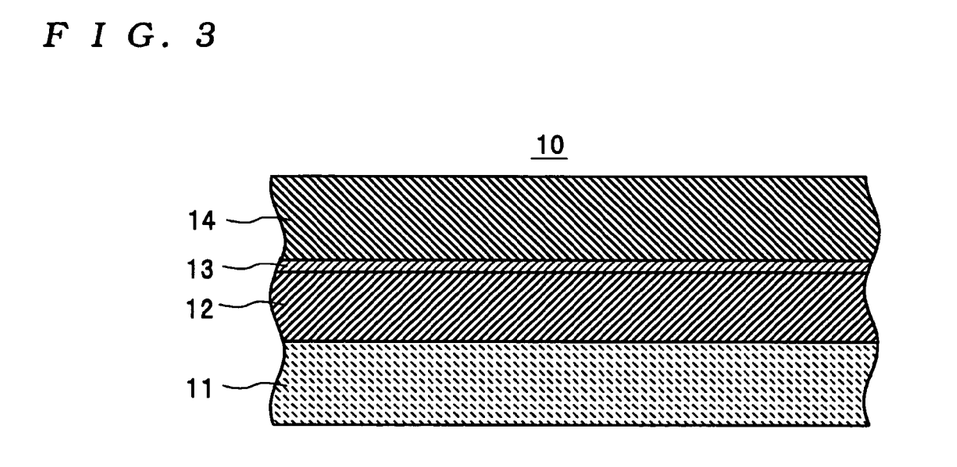
FIG. 3 is a cross-sectional view of a preform.
Figure 4:
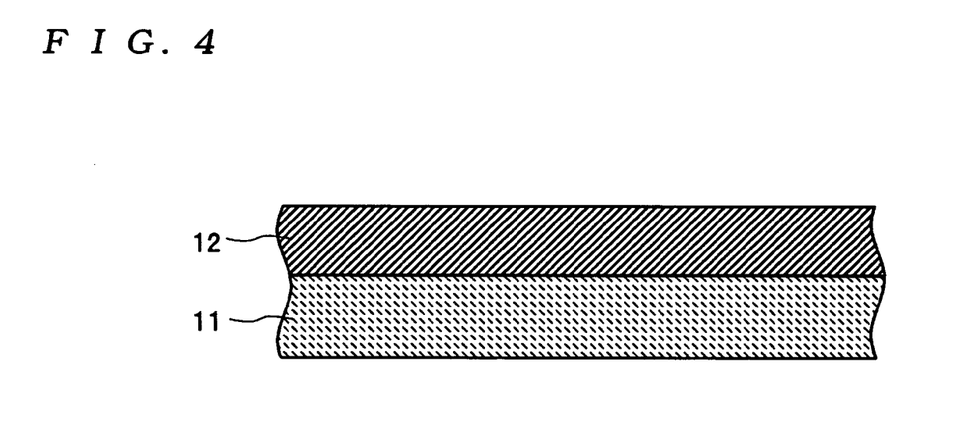
FIG. 4 is a cross-sectional view of a state where a soft magnetic layer has been formed on a glass substrate.
Figure 5:
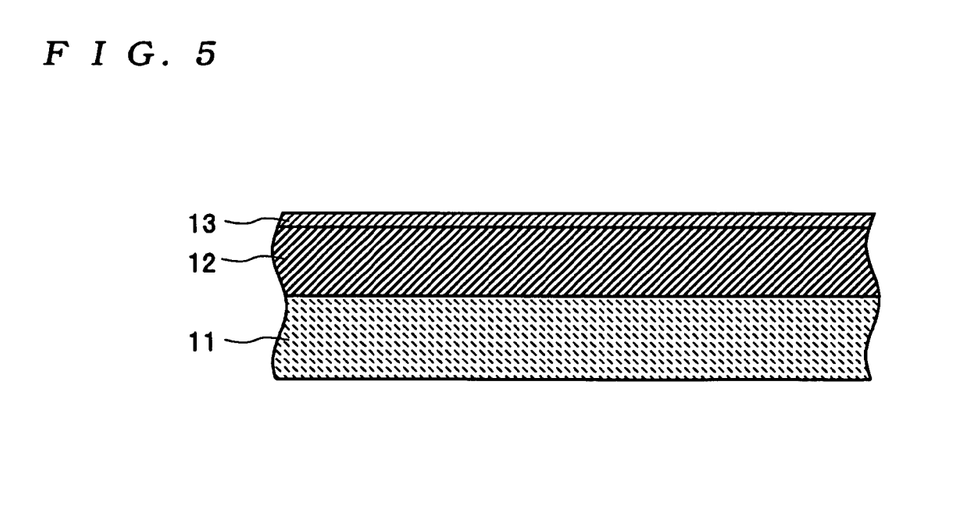
FIG. 5 is a cross-sectional view of a state where an intermediate layer has been formed on the soft magnetic layer.

First, the preform 10 for forming the magnetic recording medium 1 is fabricated. More specifically, as shown in FIG. 4, the sputtering device 102 of the magnetic recording medium manufacturing apparatus 101 forms the soft magnetic layer 12 that is around 200 nm thick by sputtering CoZrNb according to DC magnetron sputtering onto the glass substrate 11 whose diameter is 0.85 inches and whose surface roughness Ra is 0.2 to 0.3 nm, for example. Next, as shown in FIG. 5, the sputtering device 102 sputters an intermediate layer forming material onto the soft magnetic layer 12 according to DC magnetron sputtering, for example, to form the intermediate layer 13. After this, as shown in FIG. 3, the sputtering device 102 sputters a mixture of $SiO_2$ and CoPt crystal grains onto the intermediate layer 13 according to DC magnetron sputtering, for example, to form the magnetic layer 14 with a thickness of around 15 nm. By doing so, the preform 10 for manufacturing the magnetic recording medium 1 is completed.

Next, as shown in FIG. 6, the applying device 103 applies a positive electron beam resist by spin coating so as to cover the magnetic layer 14 on the preform 10, thereby forming the mask forming functional layer 17 with a thickness of around 130 nm. After this, as shown in FIG. 7, the drawing device 104 irradiates the mask forming functional layer 17 with the electron beam EB to draw an exposure pattern P1 on the mask forming functional layer 17. Next, the developing device 105 carries out a developing process on the mask forming functional layer 17 on which the exposure pattern P1 has been drawn to remove the parts that have been irradiated with the electron beam EB by the drawing device 104. By doing so, as shown in FIG. 8, the mask M1 with the convex/concave pattern P2 is formed on the magnetic layer 14. In this case, the width of the convex parts and the width of the concave parts in the mask M1 (the convex/concave pattern P2) are respectively set at 50 nm and at 30 nm. That is, the pitch of the convex parts (concave parts) is set at 80 nm. It should be noted that the method of forming the mask M1 is not limited to a method that draws the exposure pattern P1 using the drawing device 104 and has the developing device 105 carry out the developing process, and for example, it is possible to form the mask M1 by an imprinting method where a mold (stamper) with a complementary form to the convex/concave pattern P2 (a shape where the convexes and concaves are inversed) is pressed onto the mask forming functional layer 17 to transfer the convex/concave pattern of the mold.

Next, the etching device 106 carries out ion beam etching using argon (Ar) gas with the mask M1 as a mask. By doing so, as shown in FIG. 9, the magnetic layer 14 is formed in the convex/concave pattern P3 with the convex parts 21 and the concave parts 22. Next, the sputtering device 102 sputters SiO2 as a non-magnetic material with the pressure of argon (Ar) gas at 0.3 Pa in a state where no bias voltage is applied to the substrate, for example, as shown in FIG. 10, to cover the magnetic layer 14 (the convex parts 21 and the concave parts 22) with a non-magnetic material with a thickness of 50 nm, for example. In this case, as shown in FIG. 10, by sputtering in a state where a bias voltage is not applied to the substrate, a convex/concave pattern P4 is formed in the surface of the non-magnetic material covering so as to reflect the form of the convex/concave pattern P3 in the magnetic layer 14.

Next, the etching device 106 starts ion beam etching using the argon (Ar) gas on the non-magnetic material that covers the magnetic layer 14 with etching conditions where the pressure of the argon (Ar) gas is set at 0.4 Pa and the ion beam angle is set at 1 degree, for example. At this time, as shown in FIG. 11, the non-magnetic material is gradually removed by shaving off the corner parts of the convex parts (edge parts of the concave parts) of the convex/concave pattern P4. The etching device 106 finishes the ion beam etching when five minutes and twenty seconds have passed, for example. The non-magnetic material in which the convex/concave pattern P4 has been formed is gradually removed, and as shown in FIG. 12, the surfaces of the non-magnetic material that fills the respective concave parts 22, 22, . . . of the magnetic layer 14 become slightly depressed. Also, the non-magnetic layers 15, 15, are formed on the respective upper surfaces 21a, 21a, of the convex parts 21, 21 of the magnetic layer 14 by leaving the non-magnetic material formed in smoothed mountain shapes where the central parts thereof gradually protrude upward by around 2 nm, for example. Next, the sputtering device 102 forms the protective layer (a carbon film) 16 with a thickness of around 2 nm on the non-magnetic material (the non-magnetic layers 15) by sputtering carbon according to a sputtering method. After this, a Fomblin lubricant is applied on the surface of the protective layer 16 with an average thickness of around 2 nm, for example. By doing so, the magnetic recording medium 1 is completed, as shown in FIG. 1.

It should be noted that to verify the characteristics of the magnetic recording medium 1, the present inventors carried out the characteristic tests described below. For these characteristic tests, a plurality of magnetic recording apparatuses in which the magnetic recording media 1 were incorporated were fabricated. Small sliders that are 1.25 mm by 1.0 mm were used as the magnetic heads in the magnetic recording apparatuses. Also, as comparative examples, a plurality of magnetic recording apparatuses were fabricated so as to include magnetic recording media whose surfaces were polished so that the upper surfaces 21a of the convex parts 21 in the magnetic layer 14 were exposed and were flush with upper surfaces of the non-magnetic material filled in the concave parts 22 (i.e., so that the surfaces were smooth). After this, seek tests were carried out using a spin stand-type seek test apparatus. More specifically, the respective magnetic recording apparatuses were fabricated in an environment where the pressure has been reduced to 0.2 atmospheres, for example, seek operations where the magnetic head is moved from the innermost track to the outermost track were continuously carried out, and the time taken for the magnetic head to crash (break) in the respective magnetic recording apparatuses was measured. As a result, the time taken for the magnetic head to crash in the respective magnetic recording apparatuses in which the magnetic recording media 1 were incorporated was on average around 3.1 times the time taken for the magnetic head to crash in the respective magnetic recording apparatuses in which the magnetic recording media of the comparative examples were incorporated. From the above results, when a magnetic recording apparatus in which the magnetic recording medium 1 is incorporated is used in a normal usage environment, it is clear that the occurrence of damage to the magnetic head and the surface of the magnetic recording medium 1 due to the surface of the magnetic recording medium 1 and the magnetic head sticking can be sufficiently reduced.

In this way, according to the magnetic recording medium 1, by having parts (central parts) of the non-magnetic layers 15 formed on the upper surfaces 21a of the respective convex parts 21 of the magnetic layer 14 protrude more than other parts (edge parts), even if the magnetic head comes into contact during a seek, for example, it is possible to restrict such contact between the magnetic head and the protruding parts of the non-magnetic layers 15 to line or point contact, so that, compared to a conventional information recording medium whose surface is smooth, since the contact area can be sufficiently restricted during contact between the magnetic head and the non-magnetic layer 15, it is possible to sufficiently reduce the abrasion to the magnetic head and the surface of the magnetic recording medium 1 caused by contact. Also, since suitable convexes and concaves are formed by the non-magnetic layers 15 that partially protrude, it is possible to sufficiently reduce the occurrence of damage to the magnetic head and the surface of the magnetic recording medium 1 due to sticking.

In addition, by forming the non-magnetic layers 15 over the entire region of the upper surfaces 21a of the respective convex parts 21 of the magnetic layer 14, it is possible to definitely avoid direct contact between the magnetic head and the magnetic layer 14, which means that abrasion to the magnetic layer 14 can be reliably prevented.

By forming the non-magnetic layers 15 as smooth bumps where the central parts thereof gradually protrude upward without having corner parts, it is possible to sufficiently prevent damage to the magnetic head and the surface of the magnetic recording medium 1 when the magnetic head contacts the surface of the magnetic recording medium 1.

In addition, by forming the protective layer 16 on the top, it is also possible to reliably prevent abrasion to the magnetic layer 14 due to contact with the magnetic head, for example.

Figure 13:
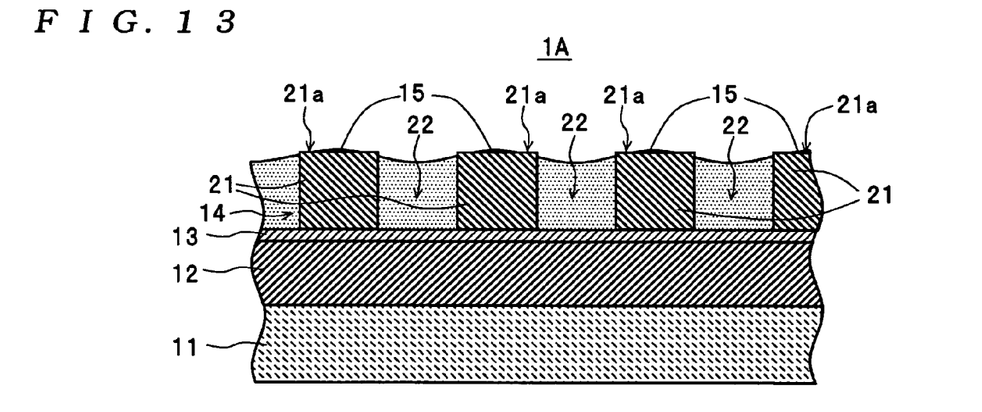
FIG. 13 is a cross-sectional view of another magnetic recording medium.

It should be noted that the present invention is not limited to this construction. For example, although an example where the non-magnetic layers 15 are formed on the entire upper surfaces 21a of the convex parts 21 of the magnetic layer 14 has been described, it is also possible to form the non-magnetic layers 15 on only part of the upper surfaces 21a as in a magnetic recording medium 1A shown in FIG. 13 (note that the protective layer 16 has not been shown in FIG. 13). When the magnetic recording medium 1A is manufactured, the etching time for the ion beam etching of the non-magnetic material in the method of manufacturing the magnetic recording medium 1 described above can be set around twenty seconds longer, for example. By doing so, as shown in FIG. 13, the non-magnetic material is removed until the edge parts of the upper surfaces 21a of the respective convex parts 21 of the magnetic layer 14 are exposed, thereby forming bump-shaped non-magnetic layers 15 whose central parts protrude upward by around 1 nm, for example, in regions (the central parts) that are around 40 nm wide and exclude the edges of the upper surfaces 21a. It should be noted that to verify the characteristics of the magnetic recording medium 1A, the present inventors fabricated a plurality of magnetic recording apparatuses in which the magnetic recording media 1A were incorporated, and carried out the same characteristics tests as described above. As a result, the time taken for the magnetic head to crash in the respective magnetic recording apparatuses in which the magnetic recording media 1A were incorporated was on average around 2.2 times the time taken for the magnetic head to crash in the respective magnetic recording apparatuses in which the magnetic recording media of the comparative examples were incorporated. From the above results, when a magnetic recording apparatus in which the magnetic recording medium 1A is incorporated is used in a normal usage environment, it is clear that the occurrence of damage to the magnetic head and the surface of the magnetic recording medium 1A due to the surface of the magnetic recording medium 1A and the magnetic head sticking can be sufficiently reduced. Also, according to the magnetic recording medium 1A, parts (the central parts of the non-magnetic layers 15) of the non-magnetic layers 15 formed on the upper surfaces 21a of the respective convex parts 21 of the magnetic layer 14 protrude more than other parts (the edges of the non-magnetic layers 15), so that in the same way as the magnetic recording medium 1, it is possible to sufficiently reduce abrasion to the magnetic head and the surface of the magnetic recording medium 1A due to contact between the magnetic head and the surface of the magnetic recording medium 1A. Also, by forming the non-magnetic layers 15 in regions aside from edges of the upper surfaces 21a of the respective convex parts 21, the amount of non-magnetic material present between the magnetic head and the convex parts 21 during the recording and reproduction of data is reduced by an amount corresponding to the lack of non-magnetic material at the edges of the respective upper surfaces 21a, so that it is possible to reduce the spacing loss, resulting in an improvement in the recording and reproduction characteristics.

Figure 14:
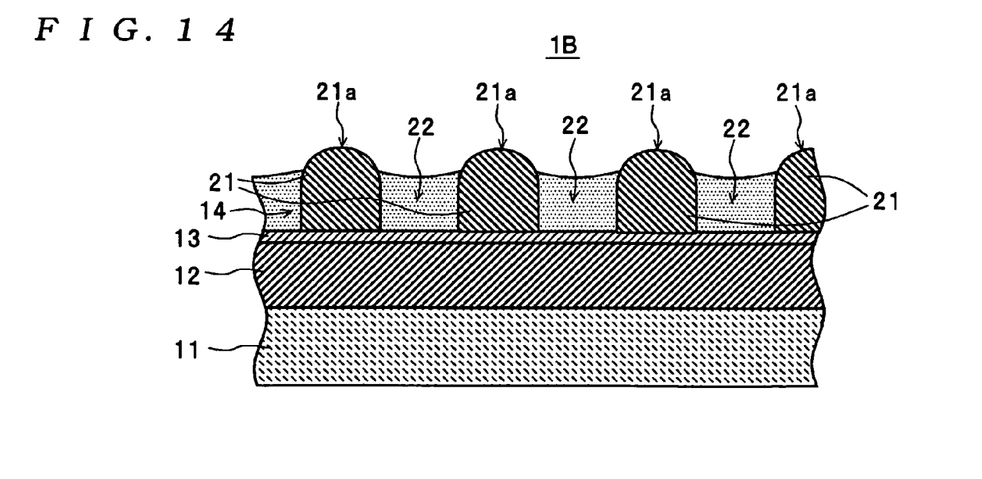
FIG. 14 is a cross-sectional view of yet another magnetic recording medium.

Also, in the same way as a magnetic recording medium 1B shown in FIG. 14 (note that the protective layer 16 has not been shown in FIG. 14), a construction can be used where upper surfaces of the respective convex parts of the magnetic layer 14 are formed in bump shapes with parts (central parts) thereof gradually protruding upward. When manufacturing the magnetic recording medium 1B, the etching time of the ion beam etching of the non-magnetic material in the method of manufacturing the magnetic recording medium 1 described above is set around forty seconds longer, for example. By doing so, as shown in FIG. 14, all of the non-magnetic material is removed from the upper surfaces 21a of the respective convex parts 21 of the magnetic layer 14 and the edge parts of the upper surfaces 21a are also shaved off, so that the convex parts 21 are formed as smooth bumps where the central parts gradually protrude upward.

It should be noted that to verify the characteristics of the magnetic recording medium 1B, the present inventors fabricated a plurality of magnetic recording apparatuses in which the magnetic recording media 1B were incorporated, and carried out the same characteristics tests as described above. As a result, the time taken for the magnetic head to crash in the respective magnetic recording apparatuses in which the magnetic recording media 1B were incorporated was on average around 1.5 times the time taken for the magnetic head to crash in the respective magnetic recording apparatuses in which the magnetic recording media of the comparative examples were incorporated. From the above results, when a magnetic recording apparatus in which the magnetic recording medium 1B is incorporated is used in a normal usage environment, it is clear that the occurrence of damage to the magnetic head and the surface of the magnetic recording medium 1B due to the surface of the magnetic recording medium 1B and the magnetic head sticking can be sufficiently reduced. In addition, according to the magnetic recording medium 1B, by forming parts (the central parts) of the upper surfaces 21a of the convex parts 21 of the magnetic layer 14 in bump shapes that protrude more than other parts (edge parts of the upper surfaces 21a), even if there is contact between the magnetic head and the surface of the magnetic recording medium 1B during a seek, for example, it is possible to restrict such contact to line or point contact, and since the contact area can be sufficiently restricted during contact between the magnetic head and the surface of the magnetic recording medium 1B, it is possible to sufficiently reduce abrasion to the magnetic head and the surface of the magnetic recording medium 1B due to contact. Also, by using a construction where the respective upper surfaces 21a of the convex parts 21 of the magnetic layer 14 protrude (are exposed) from the surface of the non-magnetic material, that is, a construction where a state where no non-magnetic material adheres to the upper surfaces 21a is maintained, no non-magnetic material will be present between the convex parts 21 of the magnetic layer 14 and the magnetic head during recording and reproduction, so that the recording and reproduction characteristics can be sufficiently improved. In addition, by forming the convex parts 21 of the magnetic layer 14 as smooth bumps so that the central parts thereof gradually protrude upward without the corner parts being formed in the upper surfaces 21a, it is possible to sufficiently prevent damage to the magnetic head and the surface of the magnetic recording medium 1B when the magnetic head contacts the surface of the magnetic recording medium 1B.

In addition, although examples where the present invention has been applied to perpendicular recording magnetic recording media 1, 1A, 1B have been described, it should be obvious that the present invention can also be applied to various kinds of information recording media such as longitudinal recording magnetic recording media.

What is claimed is:

1. An information recording medium onto which lubricant is applied, where respective concave parts of a magnetic layer, which is formed on at least one side of a substrate and in which a predetermined convex/concave pattern has been formed, are filled with non-magnetic material, and non-magnetic layers are formed by the non-magnetic material in at least partial regions of respective upper surfaces of respective convex parts of the magnetic layer,
   wherein the non-magnetic layers are formed so that parts of said non-magnetic layers over said convex parts of the magnetic layer protrude further in a direction in which the convex parts protrude than other parts of the non-magnetic layers over said convex parts of said magnetic layer, and
   wherein a protective layer comprising carbon film is formed on the non-magnetic material filled in the concave parts and on the non-magnetic layers, the lubricant being applied on a surface of the protective layer.

2. An information recording medium according to claim 1, wherein the non-magnetic layers are formed in entire regions of the respective upper surfaces of the respective convex parts.

3. An information recording medium according to claim 1, wherein the non-magnetic layers are formed in regions aside from edge parts of the respective upper surfaces of the respective convex parts.

4. An information recording medium according to claim 1, wherein the non-magnetic layers are formed so that toward central parts of the convex parts, the non-magnetic layers gradually protrude further in the direction in which the convex parts protrude.

5. The information recording medium according to claim 1, wherein the protective layer is a material different from the non-magnetic material.

* * * * *